United States Patent
Tsuchihashi et al.

(10) Patent No.: US 8,315,047 B2
(45) Date of Patent: Nov. 20, 2012

(54) ROTATABLE DISPLAY APPARATUS

(75) Inventors: Moriyuki Tsuchihashi, Sagamihara (JP); Yasumasa Takeda, Yamato (JP); Shunya Uno, Fujisawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 170 days.

(21) Appl. No.: 12/832,103

(22) Filed: Jul. 8, 2010

(65) Prior Publication Data

US 2012/0008270 A1   Jan. 12, 2012

(51) Int. Cl.
*H05K 7/00* (2006.01)

(52) U.S. Cl. ............ 361/679.26; 361/679.04; 248/919

(58) Field of Classification Search ............ 361/679.21, 361/679.26–679.28, 679.04, 679.06–679.07; 248/917; 349/58, 65; 345/169, 905
See application file for complete search history.

(56) References Cited

U.S. PATENT DOCUMENTS

| | | | | |
|---|---|---|---|---|
| 5,629,833 A * | 5/1997 | Ido et al. | ............... | 361/679.27 |
| 5,673,170 A | 9/1997 | Register | | |
| 5,708,561 A * | 1/1998 | Huilgol et al. | ........... | 361/679.07 |
| 6,522,529 B1 * | 2/2003 | Huilgol et al. | ........... | 361/679.06 |
| 7,054,145 B2 | 5/2006 | Tanaka et al. | | |
| 7,082,028 B2 * | 7/2006 | Huilgol et al. | ........... | 361/679.07 |
| 7,379,292 B2 * | 5/2008 | Tsai et al. | ................ | 361/679.27 |
| 7,817,408 B2 * | 10/2010 | Chiang et al. | ............ | 361/679.07 |
| 7,835,145 B2 * | 11/2010 | Chiang et al. | ............ | 361/679.27 |
| 7,876,554 B2 * | 1/2011 | Chou et al. | ............... | 361/679.28 |
| 8,089,750 B2 * | 1/2012 | Chen et al. | ............... | 361/679.26 |
| 2006/0077621 A1 * | 4/2006 | Adatia | ......................... | 361/681 |
| 2006/0126284 A1 * | 6/2006 | Moscovitch | .................. | 361/681 |
| 2006/0250761 A1 * | 11/2006 | Tsai et al. | ..................... | 361/681 |
| 2007/0058329 A1 * | 3/2007 | Ledbetter et al. | ............ | 361/681 |
| 2009/0296337 A1 * | 12/2009 | Chou et al. | ............... | 361/679.28 |

FOREIGN PATENT DOCUMENTS

JP    2009-230408 A    10/2009

* cited by examiner

*Primary Examiner* — Zachary M Pape
(74) *Attorney, Agent, or Firm* — Nutter McClennen & Fish LLP; John J. Penny, Jr.; Christina M. Sperry

(57) ABSTRACT

A display apparatus, comprising a display having a longitudinal edge and a latitudinal edge, where the longitudinal edge is longer than the latitudinal edge, a first supporting member having an upper end portion rotatably coupled to the display and a lower end portion rotatably coupled to a base, wherein the display is configured to be rotatable between a first position in which the longitudinal edge is substantially in parallel with the base and a second position in which the longitudinal edge is substantially perpendicular to the base.

14 Claims, 10 Drawing Sheets

FIG. 1A
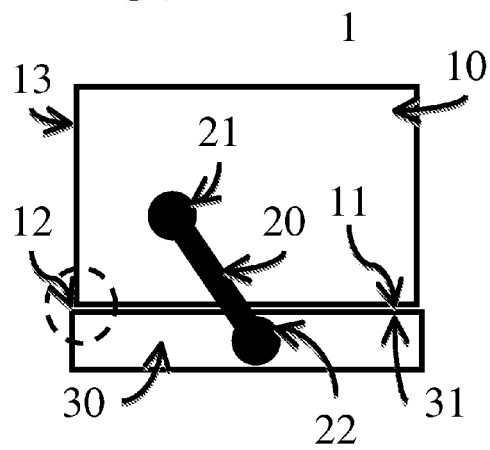
FIG. 1B
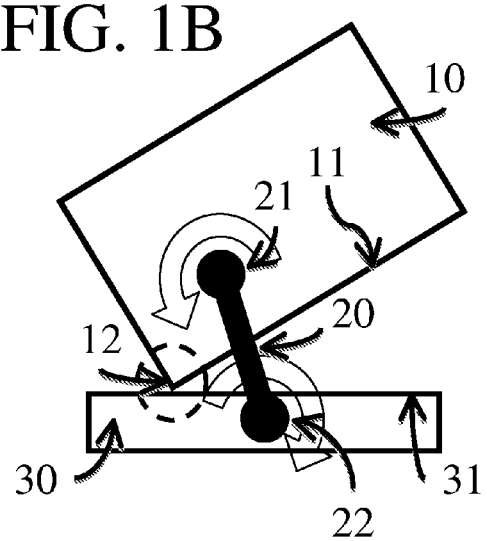
FIG. 1C
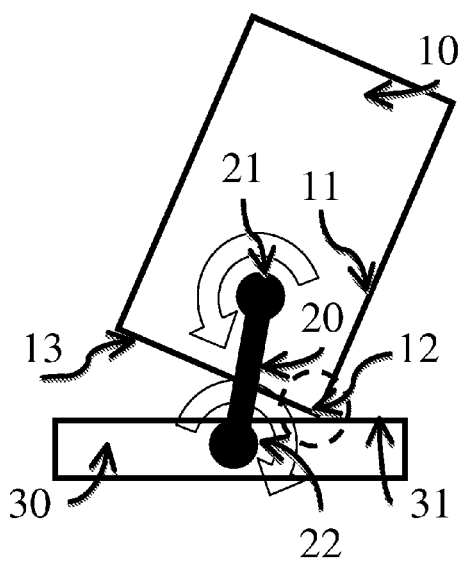
FIG. 1D
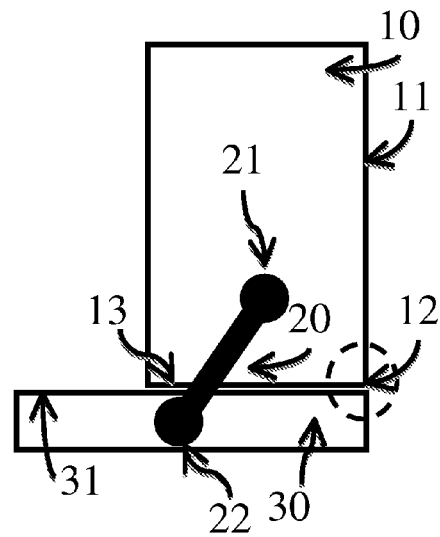
FIGS. 1A-1D

ROTATABLE DISPLAY APPARATUS

FIELD OF THE INVENTION

The present invention relates to an apparatus for rotatably supporting a display, and in particular, to a laptop computer providing a rotatable display.

BACKGROUND

Current laptop computers offer wide-screen format displays for viewing multimedia content such as movies or website contents. This wide-screen format display may allow users to perform word processing or to view documents in a landscape or portrait orientation. For working with word processing documents, the portrait orientation provides particular advantage in that a full page of the document may be displayed for user's convenience. Current laptop computer, however, do not provide a keyboard or pointing device that can be maintained in the horizontal position when the displays are positioned in the portrait orientation.

Accordingly, it would be desirable to provide a rotatable display on a laptop. Such display would enable users to view contents designed in both landscape and portrait orientations while maintaining a keyboard in a horizontal position for easy user inputs in either of the orientations.

SUMMARY OF THE INVENTION

A display apparatus, comprising a display having a longitudinal edge and a latitudinal edge, where the longitudinal edge is longer than the latitudinal edge, a first supporting member having an upper end portion rotatably coupled to the display and a lower end portion rotatably coupled to a base, wherein the display is configured to be rotatable between a first position in which the longitudinal edge is substantially in parallel with the base and a second position in which the longitudinal edge is substantially perpendicular to the base.

DESCRIPTION OF THE DRAWINGS

FIGS. 1A-1D depict a sequence of a display apparatus according to an embodiment of the present invention;

DETAILED DESCRIPTION OF THE PREFERRED EMBODIMENTS

Figure 2:
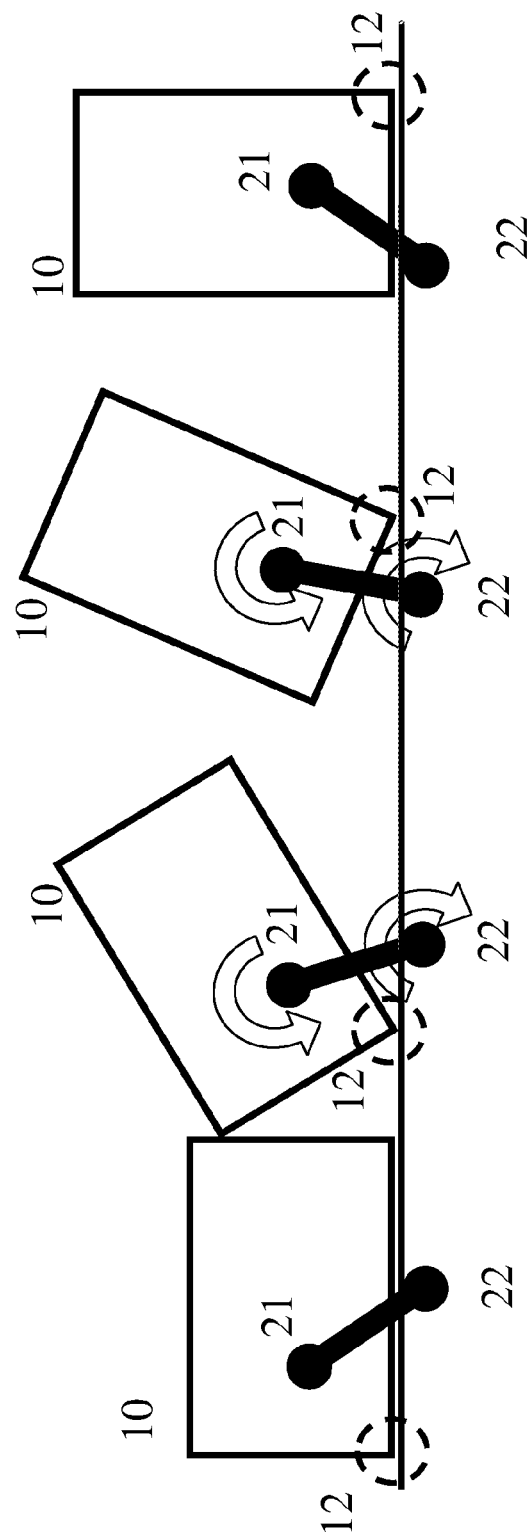
FIG. 2 depicts a sequence of the consecutive positions of display apparatus shown in FIGS. 1A-1D according to the embodiment.

FIGS. 1A-1D depict a sequence of positions of a display apparatus 1 according to an embodiment of the present invention. As shown, a display 10 is rotatably coupled to an upper end portion of a supporting member 20, thereby forming a joint 21. Also, a lower end portion of the supporting member 20 is rotatably coupled to a base 30, thereby forming a joint 22. Preferably, joints 21 and 22 are formed to rotatably couple the supporting member 20 to the display so as to rotate around an axis perpendicular to the back surface of display 10. The display 10 is preferably a wide-screen format display having longitudinal edges 11 (shown as horizontal edges in FIG. 1A) and latitudinal edges 13 (shown as vertical edges in FIG. 1A), where the ratio between the lengths of the longitudinal edges 11 and the latitudinal edges 13 is about 16:9. However, the present invention can be applied to any type of display.

In FIG. 1A, the display 10 is supported by the supporting member 20 and is optionally supported by a horizontal surface 31 of the base 30. As shown, the display 10 is positioned in a landscape orientation where its longitudinal edge 11 is substantially parallel with the horizontal surface 31.

Also, a corner 12 of the display 10 is highlighted in each of the FIGS. 1A-1D for demonstration of the orientation of the display 10 during the subsequently illustrated rotations. It should be understood that the following rotations may be performed in reverse to return the display 10 to the orientation shown in FIG. 1A.

FIG. 1B shows an intermediate orientation of the display 10 as the supporting member 20 is rotated clockwise about joint 22. At the same time, the display 10 is rotated counter-clockwise about joint 21. As a result, the longitudinal edge 11 of the display 10 is no longer substantially parallel with the horizontal surface 31 of the base 30. Also, corner 12 of the display 10 moves from the left side of the supporting member 20 towards the supporting member 20.

FIG. 1C shows a subsequent intermediate orientation of the display 10 as both the supporting member 20 and the display 10 continue their respective rotation that began in FIG. 1B. As shown, corner 12 of the display 10 has moved to the right side of the supporting member 20.

Subsequently, as shown in FIG. 1D, the display 10 has completed its rotation about the joint 21 and the supporting member 20 has completed its rotation about the joint 22. The corner 12 has moved further to the right of the supporting member 20. Also, longitudinal edge 11 is now substantially perpendicular to the horizontal surface 31 of the base 30. The resulting orientation for the display 10 is referred to as a portrait orientation. Here, the display 10 is supported by the supporting member 20 and is optionally supported by the horizontal surface 31 along a latitudinal edge 13.

Furthermore, the joints 21 and 22 preferably are formed as graduated joints that provide a predetermined amount of resistance, by frictional, mechanical, fluid or other means, in order to maintain any of the intermediate orientations of the display 10.

As shown in FIG. 2, the positions traversed by corner 12 may be maintained substantially parallel to the horizontal surface 31 by rotating the display 10 and the supporting member 20 at substantially the same rate. This prevents the corners of the display, including corner 12, from impacting the horizontal surface 31 or other similarly positioned surfaces or objects.

Next, FIGS. 3A-3D depict a sequence of display apparatus 1 according to another embodiment of the present invention. As shown therein, a display 10 is rotatably coupled to an upper end portion of a first supporting member 20a, thereby forming a joint 21a, and is rotatably coupled to an upper end portion of a second supporting member 20b, thereby forming a joint 21b. Also, a lower end portion of the supporting member 20a is rotatably coupled to a base 30, thereby forming a joint 22a. Similarly, a lower end portion of the supporting member 20b is rotatably coupled to a base 30, thereby forming a joint 22b. Furthermore, the display 10 is preferably coupled to the upper end portions of the supporting members 20a and 20b along a longitudinal edge 11 of the display 10, where joints 21a and 21b are positioned substantially horizontal in relation to each other. Furthermore, the display 10 forms the joints 21a and 21b along a structural frame portion 14 of the display 10.

According to this embodiment, the display 10 is preferably a wide-screen format display having longitudinal edges 11 (shown as horizontal edges in FIG. 3A) and latitudinal edges 13 (shown as vertical edges in FIG. 3A), where the ratio between the lengths of the longitudinal edges 11 and the latitudinal edges 13 is about 16:9. However, the present invention can be applied to any type of display.

Figure 3A:
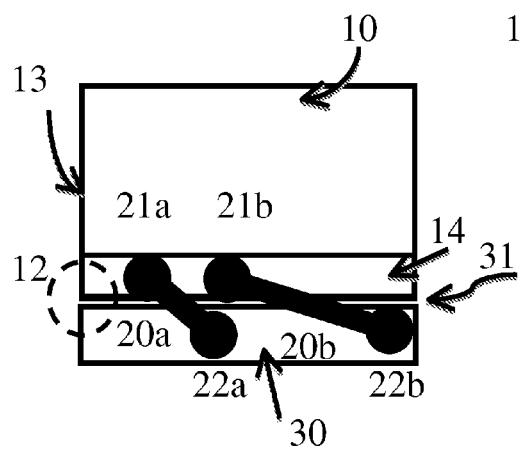
FIGS. 3A-3D depict a sequence of a display apparatus according to another embodiment of the present invention.

In FIG. 3A, the display 10 is supported by the supporting members 20a and 20b and is optionally supported by a horizontal surface 31 of the base 30. As shown, the display 10 is positioned in a landscape orientation where its longitudinal edge 11 is substantially parallel with the horizontal surface 31.

Also, a corner 12 of the display 10 is highlighted in each of the FIGS. 3A-3D for demonstration of the orientation of the display 10 during the subsequently illustrated rotations. It should be understood that the following rotations may be performed in reverse to return the display 10 to the orientation shown in FIG. 3A.

Figure 3B:
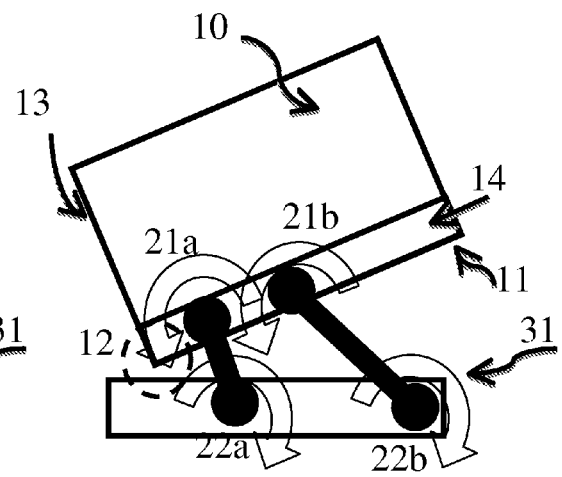

FIG. 3B shows an intermediate orientation of the display 10 as the supporting members 20a and 20b are rotated clockwise about joints 22a and 22b, respectively. At the same time, the display 10 is rotated counterclockwise about joints 21a and 21b. As a result, the longitudinal edge 11 of the display 10 is no longer substantially parallel with the horizontal surface 31 of the base 30. Also, corner 12 of the display 10 moves from the left side of the supporting member 20a towards the supporting member 20a.

Further shown in FIG. 3B, since supporting member 20b is substantially longer than supporting member 20a, as the display 10 rotates counterclockwise about both supporting members 20a and 20b, the display 10 is also moved vertically away from the horizontal surface 31. Accordingly, corner 12 is also moved vertically away from the horizontal surface 31 as it moves towards the supporting member 20a. This prevents the corners of the display, including corner 12, from impacting the horizontal surface 31 or other similarly positioned surfaces or objects.

Figure 3C:
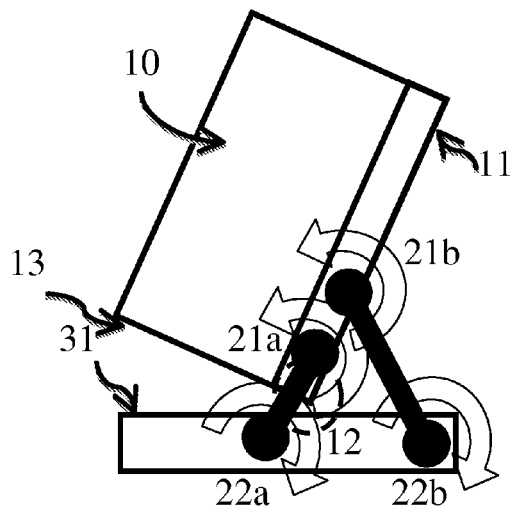

FIG. 3C shows a subsequent intermediate orientation of the display 10 as the supporting members 20a, 20b, and the display 10 continue their respective rotation that began in FIG. 3B. As shown, corner 12 of the display 10 has moved to the right side of the supporting member 20a. Furthermore, the corner 12 remained on the left side of the supporting member 20b.

Figure 3D:
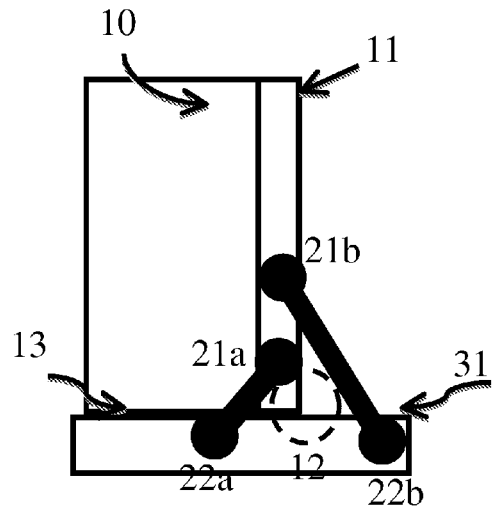

Subsequently, as shown in FIG. 3D, the display 10 has completed its rotation about the joints 21a, 21b, and the supporting members 20a and 20b have completed their rotation about the joints 22a and 22b, respectively. The corner 12 has moved further to the right of the supporting member 20a. Also, longitudinal edge 11 is now substantially perpendicular to the horizontal surface 31 of the base 30. The resulting orientation for the display 10 is a portrait orientation. As the display 10 completes its rotation in FIG. 3D, the corner 12 is moved vertically towards the horizontal surface 31. Here, the display 10 is supported by the supporting members 20a and 20b, and is optionally supported by the horizontal surface 31 along a latitudinal edge 13.

Further shown in FIG. 3D, the joints 21a and 21b are now positioned substantially vertically in relation to each other.

Furthermore, the joints 21a, 21b, 22a, and 22b preferably are formed as graduated joints that provide a predetermined amount of resistance, by frictional, mechanical, fluid or other means, to maintain any of the intermediate orientations of the display 10. Alternatively, the joints 21a, 21b, 22a, and 22b may be formed as substantially smooth rotating joints that do not maintain any of the intermediate orientations of the display 10. In this case, the display 10 is supported in the vertical and horizontal orientations and stopped from further rotations by the contact between the edges of display 10 and the horizontal surface 31 of the base 30.

Figure 3E:
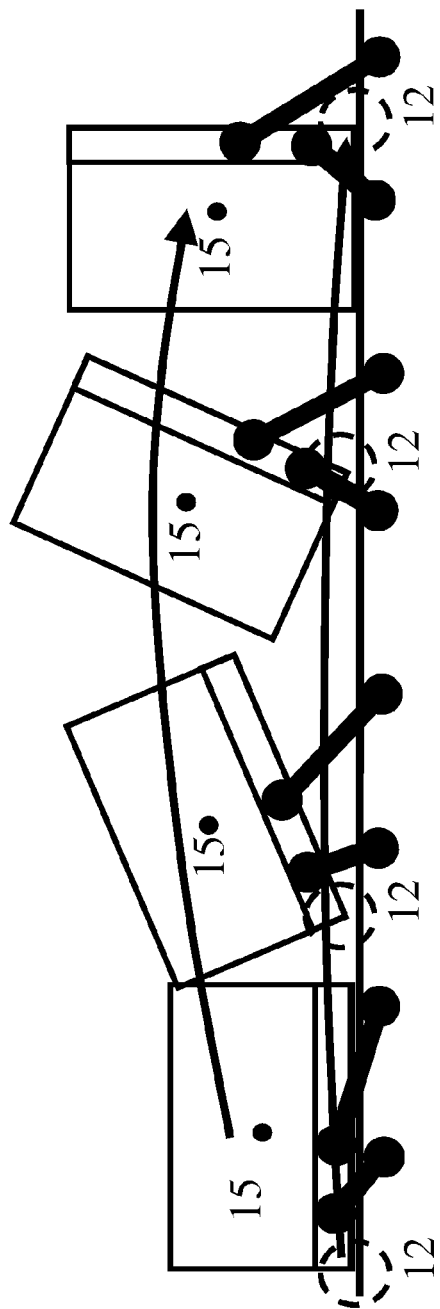
FIG. 3E depicts a sequence of the consecutive positions of display apparatus shown in FIGS. 3A-3D according to the another embodiment.

As shown in FIG. 3E, the positions traversed by corner 12 and a centroid portion 15 of the display 10 are substantially parabolic, where the display 10 is initially elevated vertically away from the horizontal surface 31, and subsequently moved vertically towards the horizontal surface 31. Accordingly, the display 10 may be supported by the horizontal surface 31 along the longitudinal edge 11 in the landscape orientation and supported by the horizontal surface 31 along the latitudinal edge 13 in the portrait orientation. Further, corners of the display 10, including corner 12, are prevented from impacting the horizontal surface 31, or similarly positioned surfaces or objects.

FIGS. 4A-4D depicts another embodiment of the display apparatus and related enclosures.

Figure 4A:
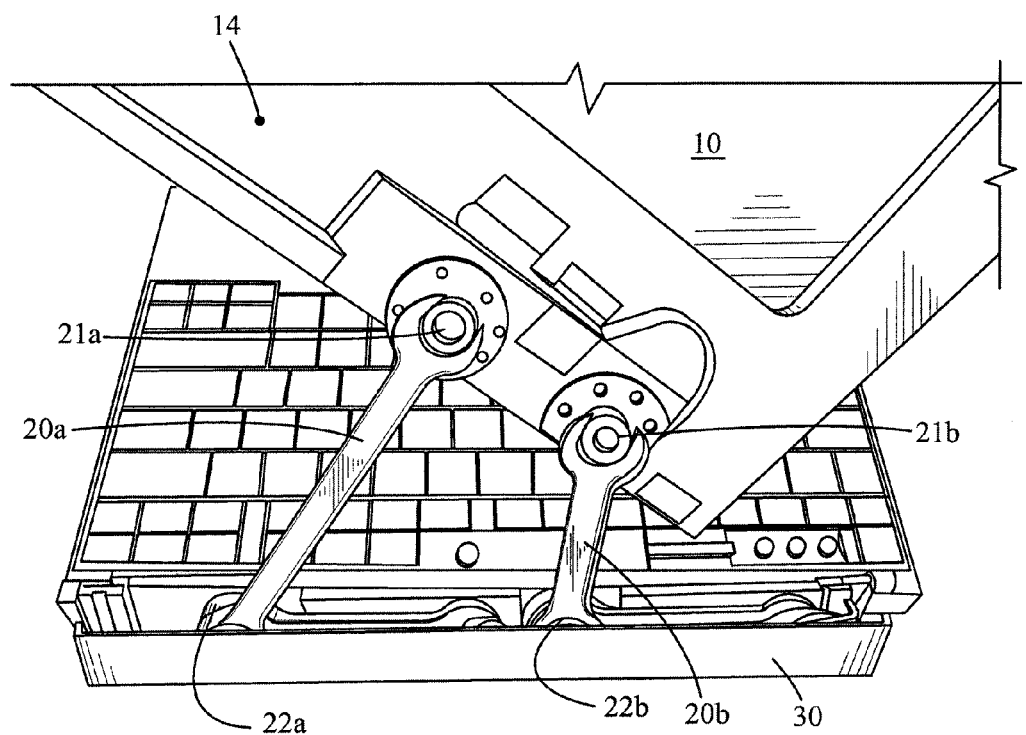
FIG. 4A-4D depicts another embodiment of the display apparatus and related enclosures.

As shown in FIG. 4A, ratchet wrenches can be used as the supporting members 20a and 20b. Each of the ratchet wrenches includes an upper end portion fixed to a rotatable portion of a ball bearing unit. A flanged portion of each ball bearing unit is fixed on the structural frame 14 of the display 10 with a plurality of screws. The upper end portions of the ratchet wrenches are preferably bonded the ball bearing unit with an adhesive compound or fixed thereto with any other bonding method, thereby forming joints 21a and 21b.

Figure 4B:
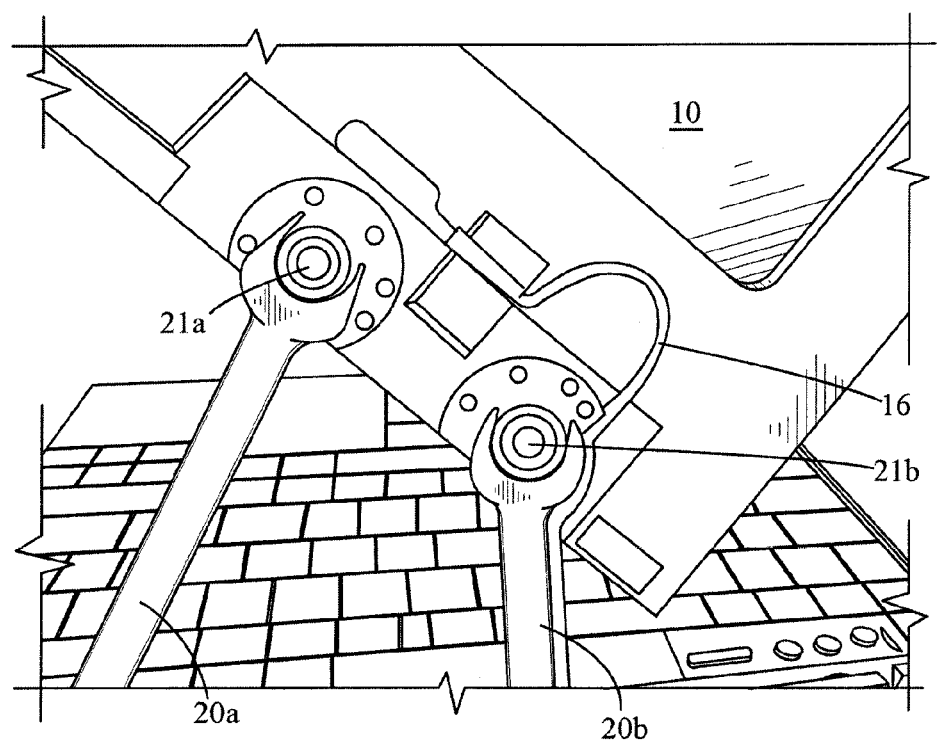
Figure 4C:
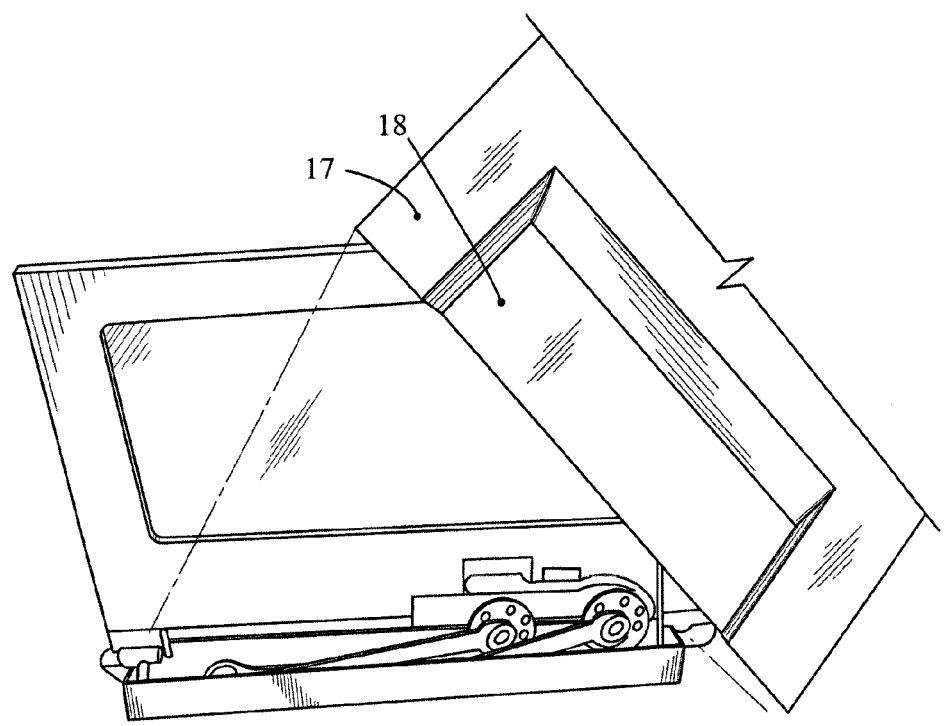

It should be understood that the embodiment shown in FIGS. 4A-4C uses ratchet wrenches for illustrative purposes. In production, supporting members 20a and 20b may be constructed with any equivalent rotatable and ratcheting mechanism.

Each of the lower end portions of the ratchet wrenches includes a modified ratcheted end portion that is coupled to the base 30. Each of the ratchet wrenches is preferably coupled with a bolt fixed inside the base 30 and the modified ratcheted end portions permit bi-direction ratcheting. The bolts preferably having a bolt head sized to match the geometrical dimensions of the ratcheted end portions of the ratchet wrenches. Here, the ratchet wrenches are coupled such that the ratchet wrenches are rotatable about ratcheted end portions, thereby forming joints 22a and 22b. In particular, the joints 22a and 22b are preferably adapted to rotate at graduated radial spans or rotate with a predetermined amount of resistance, to maintain any intermediate positions of the wrenches throughout their rotational range.

Furthermore, the base 30 is preferably formed as an enclosure that includes anchoring members for coupling with the ratchet wrenches. The base 30 is attached to a laptop computer enclosure with two rotatable hinges. The rotatable hinges allow the base 30 to rotate about an axis formed between the two hinges such that the display 10 may be rotated to overlap with the laptop computer (this is commonly referred to as a "closed" position).

As shown in FIG. 4B, a cable bundle 16 is provided along side of the supporting member 20b. Accordingly, the physical size of the joints 21a and 21b may be minimized and optimized for structural strength.

Furthermore, in FIG. 4C, a cover 17 is provided to protect the cable 16, supporting members 20a, 20b, and joints 21a, 21b from external impact or exposure. In particular, the cover 17 is provided with a slot opening 18 that permits the supporting members to rotate from traversing a horizontal edge of the display to traversing a vertical edge. Here, the supporting members slide in parts outside of the cover when the display 10 rotates to a vertical orientation.

Figure 4D:
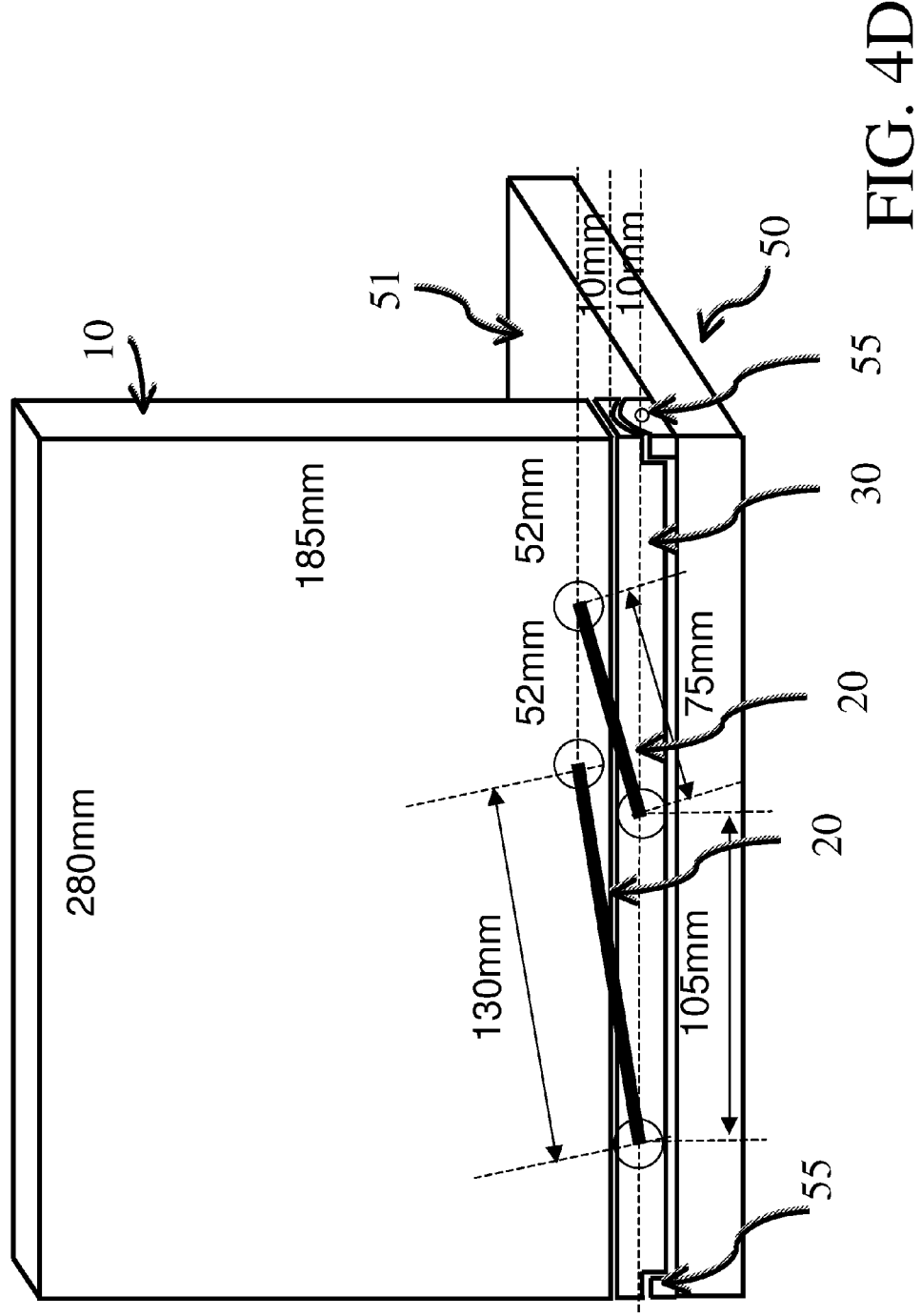
Figure 5A:
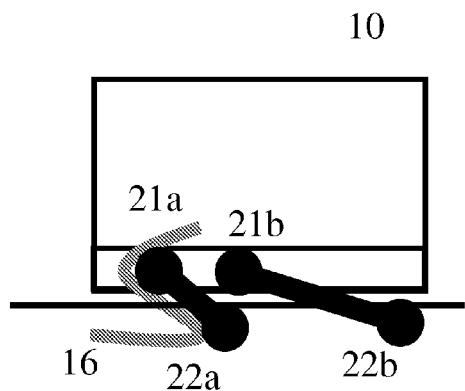
FIGS. 5A-5D depict a sequence of arrangement of the cables for the display apparatus according to the another embodiment.
Figure 5B:
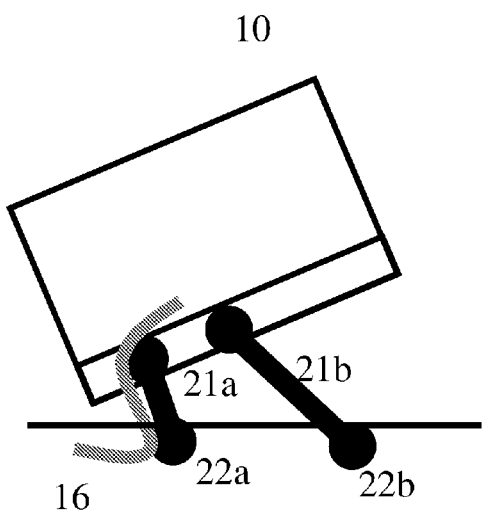
Figure 5C:
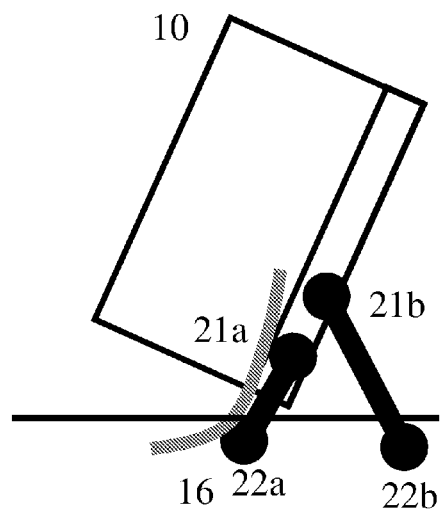
Figure 5D:
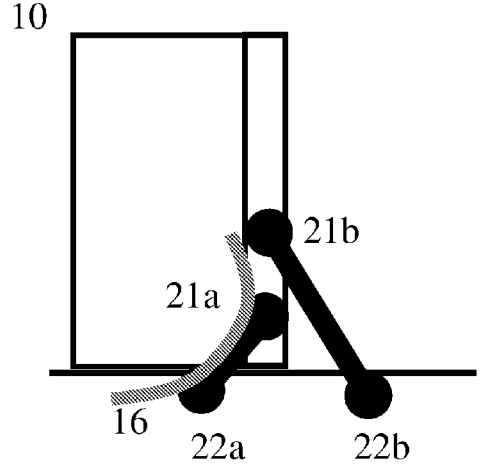

As shown in FIG. 4D, supporting member 20a preferably is 130 mm in length and supporting member 20b preferably is 75 mm in length. The joint 22a is formed on the base 30 at 105 mm away from the location at which the joint 22b is formed on the base 30. Both joints 22a and 22b preferably are formed at a 10 mm vertical distance from the horizontal surface 31. On the upper portions of the supporting members 20a and 20b, the joints 21a and 21b preferably are formed on the display 10 at a 10 mm vertical distance from the horizontal edge 11. The joint 21b preferably is formed 52 mm from the vertical edge 11 and the joint 21a preferably is formed at a horizontal distance of 52 mm from the joint 21a.

As shown in FIG. 4D, the base 30 is coupled to a main body 50 of personal computer with hinges 55. As described in the preferred embodiments of the present invention, the display 10 is connected to the base 30 with supporting members 20, and rotates between landscape/portrait positions. The hinges 55 allows the display 10 and the main body 50 to open and close in a "clam shell" manner. Accordingly, the personal computer includes a main body 50 that provides a keyboard on a top surface 51, and includes a lid comprised of the base 30 and the display 10.

FIGS. 5A-5D depict a sequence of arrangement of the cables for the display apparatus according to the another embodiment. As shown, a cable 16 is coupled to the display 10 on one end and coupled to the base 30 on another end. The cable 16 provides at least a power supply to the display 10 and a data connection from a processor (not shown) to the display 10. According to a preferred embodiment, the cable 16 is provided outside of the joints 21a and 22a. Alternatively, the cable 16 may be provided through an interior space of the joints 21a and 22a, or an interior space of the joints 21b and 22b. Further alternatively, the cable 16 may be provided through the interior space of joint 21a but not joint 22a, or vise versa. Further alternatively, the cable 16 may be provided through the interior space of joint 21b but not joint 22b, or vise versa.

As shown in FIGS. 5A-5D, the cable 16 preferably is provided outside of the joints in order to allow more compact joints to be formed on the display 10 and the base 30, and also to prevent stress on the cable to thereby prevent damage to the cable.

Figure 6A:
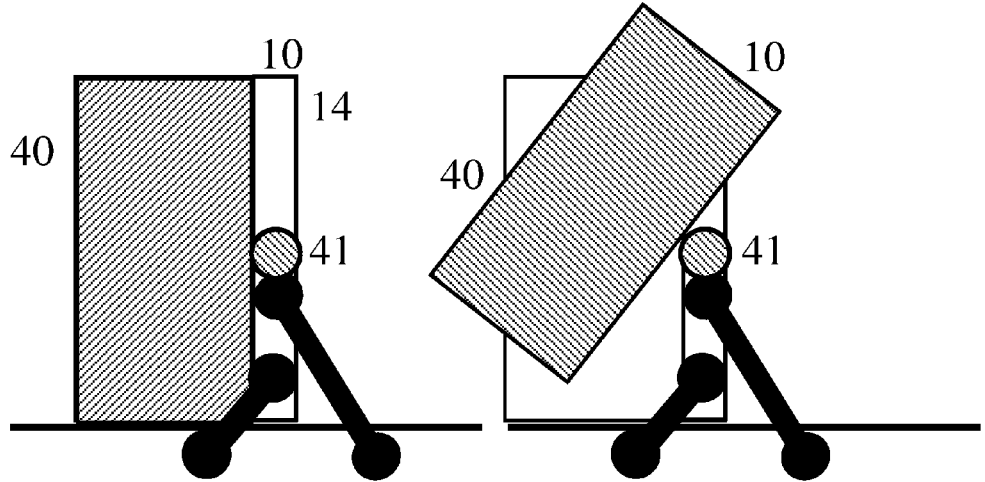
FIGS. 6A-6D depict a secondary display provided on the display apparatus according to another embodiment.
Figure 6B:
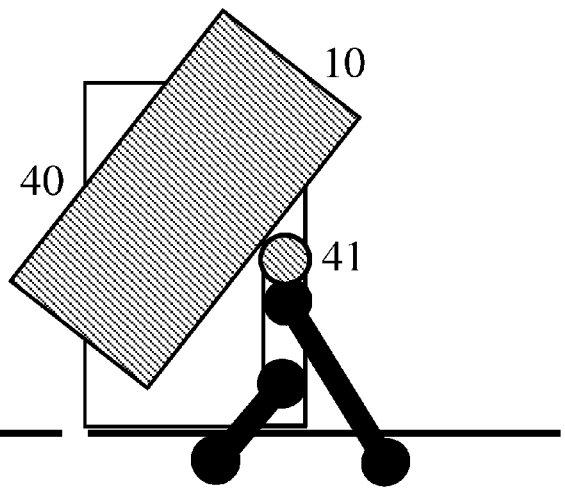
Figure 6C:
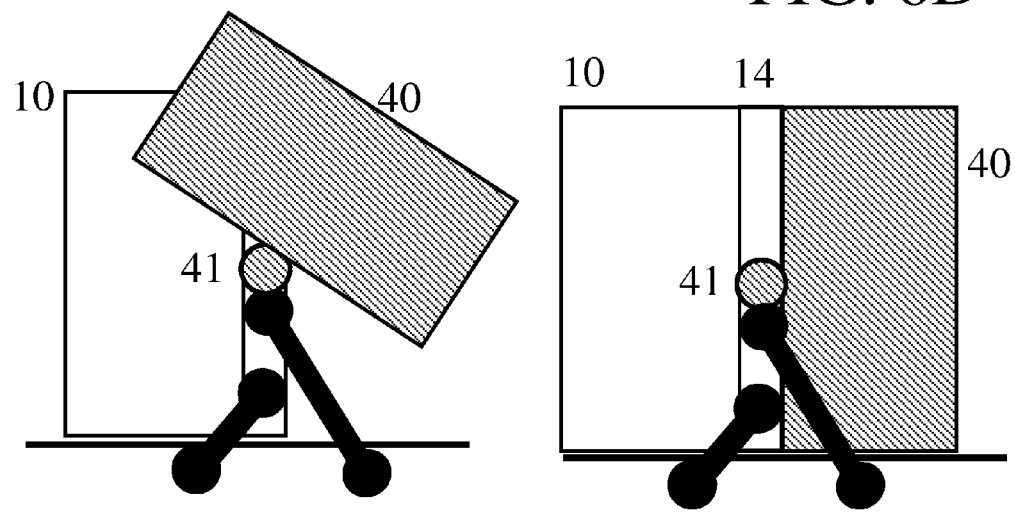
Figure 6D:
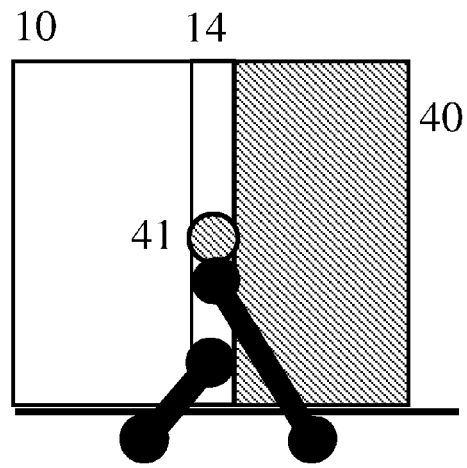

FIGS. 6A-6D depict a secondary display 40 provided on the display apparatus according to another embodiment. In particular, in FIG. 6A, display 10 is positioned in a portrait orientation as in FIGS. 3D and 5D. Here in FIG. 6A, a secondary display 40 is preferably disposed in an overlapping position with the display 10. The secondary display 40 is further preferably coupled to the structural frame 14 of the display 10 and forms a joint 41. As shown in FIGS. 6B and 6C, the secondary display 40 is rotated clockwise about the joint 41 to a position that no longer overlaps with the display 10. Finally, as shown in FIG. 6D, the display 40 completes it rotation about the joint 41 and is positioned along a side of the display 10. In this arrangement, the displays 10 and 40 may be configured to display a collectively large area for user's convenience or additional functionalities. Preferably, joint 41 is formed to rotatably couple the secondary display 40 to rotate around an axis perpendicular to the back surface of display 10.

Although the present invention has been described in connection with the preferred embodiments thereof with reference to the accompanying drawings, it should be understood that the invention is not limited to the disclosed embodiments. Various changes and modifications apparent to those skilled in the art are included within the scope of the present invention defined by the claims.

What is claimed is:

1. A display apparatus, comprising:
a display having a longitudinal edge and a latitudinal edge, where the longitudinal edge is longer than the latitudinal edge; a first supporting member having an upper end portion rotatably coupled to the display and a lower end portion rotatably coupled to a base; and a second supporting member, which is substantially longer than the first supporting member, having an upper end portion rotatably coupled to the display and a lower end portion rotatably coupled to the base; wherein the display is configured to be rotatable between a first position in which the longitudinal edge is substantially parallel with the base and a second position in which the longitudinal edge is substantially perpendicular to the base, wherein when the display is in the first position, a substantial length of the longitudinal edge is positioned along a horizontal surface of the base, and when the display is in the second position, a substantial length of the latitudinal edge is positioned along the horizontal surface, and wherein when the display is in the first position, the horizontal surface supports the longitudinal edge, and when the display is in the second position, the horizontal surface supports the latitudinal edge.

2. The display apparatus of claim 1, wherein the first and second supporting members are coupled to the display along a longitudinal edge of the display.

3. The display apparatus of claim 2, wherein the first and second supporting members are coupled to a structural frame of the display.

4. The display apparatus of claim 3, wherein the upper end portions of the first and second supporting members are rotatably coupled to the display and form ratcheting joints.

5. The display apparatus of claim 4, wherein the lower end portions of the first and second supporting members are rotatably coupled to the base and form ratcheting joints.

6. The display apparatus of claim 5, wherein the ratcheting joints are formed at a portion of the base that rotates about an axis in a plane of the rotation of the display.

7. The display apparatus of claim 1, further including:
a second display rotatably coupled to the display and configured to rotate between a first position in which the second display substantially overlaps the display and a second position in which the second display is substantially adjacent to the display.

8. The display apparatus of claim 1, further including:
a cable providing electrical connection between the base and the display, said cable being arranged outside of a joint that couples the first supporting member to the display.

9. The laptop computer of claim 1, wherein:
the display is configured to be rotatable counterclockwise in a left direction to move from the first position to the second position;
the first supporting member is coupled to the display to the left of the second supporting member; and
the first supporting member is coupled to the base to the left of the second supporting member.

10. A computer comprising:
a display having a longitudinal edge and a latitudinal edge, where the longitudinal edge is longer than the latitudinal edge;
a base having a horizontal surface;
a first supporting member having an upper end portion rotatably coupled to the display and a lower end portion rotatably coupled to the base; and
a second supporting member, which is substantially longer than the first supporting member, having an upper end portion rotatably coupled to the display and a lower end portion rotatably coupled to the base;
wherein the display is configured to be rotatable between a first position in which the longitudinal edge is substantially parallel with the base and in which a substantial length of the longitudinal edge is positioned along and supported by the horizontal surface of the base, and a second position in which the longitudinal edge is substantially perpendicular to the base and in which a substantial length of the latitudinal edge is positioned along and supported by the horizontal surface of the base.

11. The computer of claim 10, further including:
a cable providing electrical connection between the base and the display, said cable being arranged outside of a joint that couples the first supporting member to the display.

12. The computer of claim 10, further including:
a second display rotatably coupled to the display and configured to rotate between a first position in which the second display substantially overlaps the display and a second position in which the second display is substantially adjacent to the display.

13. A laptop computer comprising:
a display having a longitudinal edge and a latitudinal edge, where the longitudinal edge is longer than the latitudinal edge; a first supporting member having an upper end portion rotatably coupled to the display and a lower end portion rotatably coupled to a base; and a second supporting member having an upper end portion rotatably coupled to the display and a lower end portion rotatably coupled to the base, the second supporting member being substantially longer than the first supporting member; wherein the display is configured to be rotatable between a first position in which the longitudinal edge is substantially parallel with the base and a second position in which the longitudinal edge is substantially perpendicular to the base; the base is rotatably connected to a main body of the laptop computer with a hinge; when the display is in the first position, a substantial length of the longitudinal edge is positioned along a horizontal surface of the base, and when the display is in the second position, a substantial length of the latitudinal edge is positioned along the horizontal surface; and when the display is in the first position, the horizontal surface supports the longitudinal edge, and when the display is in the second position, the horizontal surface supports the latitudinal edge.

14. The laptop computer of claim 13, wherein:
the display is configured to be rotatable counterclockwise in a left direction to move from the first position to the second position;
the first supporting member is coupled to the display to the left of the second supporting member; and
the first supporting member is coupled to the base to the left of the second supporting member.

* * * * *